United States Patent
Ehuraj

(10) Patent No.: US 8,348,356 B2
(45) Date of Patent: Jan. 8, 2013

(54) COMBINATION IDLER RECOIL AND TENSION ADJUSTMENT ASSEMBLY AND METHOD FOR IDENTIFYING SOURCE OF LEAKAGE IN SAME

(75) Inventor: Regini Selvapal Ehuraj, Chennai (IN)

(73) Assignee: Caterpillar Inc., Peoria, IL (US)

( * ) Notice: Subject to any disclaimer, the term of this patent is extended or adjusted under 35 U.S.C. 154(b) by 270 days.

(21) Appl. No.: 12/832,465

(22) Filed: Jul. 8, 2010

(65) Prior Publication Data

US 2012/0007420 A1   Jan. 12, 2012

(51) Int. Cl.
*B62D 55/30* (2006.01)
*B62D 55/32* (2006.01)

(52) U.S. Cl. .......................... 305/148; 305/143

(58) Field of Classification Search .............. 305/124, 305/125, 143, 144, 145, 146, 147, 148, 151, 305/152, 153, 155
See application file for complete search history.

(56) References Cited

U.S. PATENT DOCUMENTS

| | | | | |
|---|---|---|---|---|
| 3,645,586 | A | * | 2/1972 | Piepho ........................ 305/146 |
| 3,792,910 | A | * | 2/1974 | Kaufman et al. ............ 305/148 |
| 4,881,786 | A | * | 11/1989 | Tonsor ......................... 305/145 |
| 6,249,994 | B1 | | 6/2001 | Oertley |
| 6,276,768 | B1 | | 8/2001 | Miller |
| 6,280,010 | B1 | | 8/2001 | Oertley |
| 6,305,762 | B1 | | 10/2001 | Oertley |
| 6,682,155 | B2 | | 1/2004 | Hoff et al. |
| 6,948,783 | B2 | | 9/2005 | Hoff |
| 7,252,349 | B2 | * | 8/2007 | Livesay et al. ............... 305/143 |
| 8,011,740 | B2 | * | 9/2011 | Matthys ....................... 305/148 |
| 2008/0265666 | A1 | | 10/2008 | Livesay et al. |
| 2009/0200862 | A1 | | 8/2009 | Matthys |

FOREIGN PATENT DOCUMENTS

JP          56108360 A   *   8/1981

* cited by examiner

*Primary Examiner* — Kip T Kotter
(74) *Attorney, Agent, or Firm* — Miller, Matthias & Hull

(57) ABSTRACT

An idler recoil and tension adjustment assembly is disclosed which provides a visual indication to the operator when either the idler recoil section or the tension adjustment section has developed a leak. The idler recoil and tension adjustment assembly includes a housing that accommodates a reciprocating shaft that includes both an idler recoil section and a tension adjustment section. The tension adjustment section is in communication with the grease port and the idler recoil section is in communication with a gas port. The grease and gas ports are coupled to the reciprocating shaft at an attachment section disposed between the idler recoil and tension adjustment sections. A blocking plate is slideably mounted to the attachment section and a shaft or roller is provided inside the housing so that when a leak develops in one of the sections the blocking plate may provide a visual indication to the operator as to which section, the idler recoil or the tension adjustment, is experiencing a leak.

18 Claims, 5 Drawing Sheets

COMBINATION IDLER RECOIL AND TENSION ADJUSTMENT ASSEMBLY AND METHOD FOR IDENTIFYING SOURCE OF LEAKAGE IN SAME

TECHNICAL FIELD

This disclosure relates generally to idler recoil systems for machines that also include tension adjustment mechanisms. More specifically, this disclosure relates to a track frame roller assembly that includes an idler recoil and tension adjustment assembly enclosed in a housing. Still more specifically, this disclosure relates to idler recoil systems where leakage from the idler recoil section or leakage from the tension adjustment section can be readily detected by the operator.

BACKGROUND

A tracked machine, such as a track-type tractor or excavator, is typically supported and propelled by a pair of drive track undercarriages. Each of drive track undercarriage includes an endless chain having a plurality of interconnected articulating components or links. Each drive track undercarriage typically also includes a drive wheel or sprocket and one or more idlers. The chain is advanced around the sprocket and the one or more idlers.

During operation of the work machine, it is necessary to maintain tension on the chain in order to keep the chain from derailing or from jumping between teeth on the sprocket. In order to maintain tension on the chain, a tension adjustment mechanism such as a hydraulic cylinder or coiled spring is often included in the drive track undercarriage.

With regard to excavators and other similar track machines, it is generally desirable to have the chain relatively taut during performance of a digging or other type of work operation in order to prevent the excavator from rolling back and forth within the interior of the chain as a result of recoil forces generated during performance of the work operation. When digging with a tight chain, the machine feels more stable to the operator and less wear occurs to the track components. To create tension on the chain, the hydraulic or grease-filled cylinder of the tension adjustment mechanism urges the idler away from the drive wheel.

In contrast, it is generally desirable to have the chain relatively loose during advancement or travel of an excavator or other similar track machines. By loosening or otherwise decreasing tension on the chain below the tension used when digging, wear on the components associated with the drive track undercarriage is reduced. This increases the efficiency and useful life of the excavator. To reduce tension in the chain, the hydraulic or grease-filled cylinder of the tension adjustment mechanism allows the idler to move toward the drive wheel.

The tension adjustment mechanism may also provide a recoil function in the chain, which accommodates temporary forces on the track such as when a rock or the like becomes wedged between the track and the wheels. In these instances, the idler is permitted to recoil toward the drive wheel in order to accommodate the extra length the track must encircle in order to accommodate the rock without breaking. The recoil function may be performed by a gas filled shock absorbing telescoping section. In contrast, the tension adjustment function may be performed by a hydraulic or grease-filled telescoping section.

A problem arises when one of these two sections develops a leak. Because the entire recoil and tension adjustment assembly is contained within the housing, the operator has difficulty in identifying which section is leaking and therefore which section requires maintenance.

SUMMARY OF THE DISCLOSURE

An idler recoil and tension adjustment assembly is disclosed that provides a clear, unambiguous indication to the operator that a leak has occurred in either the idler recoil section or the tension adjustment section so the operator can easily identify which section requires maintenance.

One disclosed idler recoil and tension adjustment assembly includes a housing including a housing contact end and a yoke contact end. The yoke contact end obviously accommodates a yoke that engages an idler. The housing accommodates a reciprocating shaft that includes an idler recoil section and a tension adjustment section. The tension adjustment section is in communication with a grease port or, if grease is not used as the working fluid, a port that receives hydraulic fluid, oil or other suitable material. The idler recoil section is in communication with a gas port, assuming the idler recoil section is a gas spring. However, the idler recoil section may employ a different working fluid, such as a hydraulic fluid or other material as will be apparent to those skilled in the art. Both the grease and gas ports are coupled to the reciprocating shaft. The reciprocating shaft is slideably coupled to a blocking plate and the housing is coupled to an abutment or includes an abutment that engages the blocking plate in the event the idler recoil section or the tension adjustment section develops a leak thereby causing the reciprocating shaft to move towards the housing contact end and away and from the yoke. This movement also causes the blocking plate to move towards at least one of the grease and gas ports. During this movement, engagement between the abutment and blocking plate pushes the blocking plate to a position where the grease port or the gas port is blocked by the blocking plate when the tension adjustment section or the idler recoil section, respectively, develops a leak Accordingly, when one of the idler recoil or tension adjustment sections develops a leak, thereby reducing the length of the leaking section that also has a telescoping function, the blocking plate, which is mounted to the reciprocating shaft moves towards the grease and/or gas port. When the blocking plate engages the abutment, it slides into a position where one of the grease and gas ports is blocked or is inaccessible. The operator will then realize which section, the idler recoil or the tension adjustment, requires maintenance.

For example, if it is desirable to block access to the grease port when the idler recoil section develops a gas leak, the blocking plate will slide into position blocking access to the grease port so the operator knows that the unexposed gas port is a signal that the idler recoil section, which may be a gas spring, requires maintenance in the form of leak detection, leak identification or an increase in gas pressure. Other combinations and variations will be apparent to those skilled in the art such as using the blocking plate to block access to the gas port to either provide an indication that the idler recoil section is leaking or to provide an indication that the tension adjustment section is leaking. Multiple variations are anticipated.

An improved machine is also disclosed that includes a track roller frame assembly that includes a housing accommodating an idler recoil and tension adjustment assembly. The housing includes a housing contact end and a yoke contact end. The housing also includes an access opening. The idler recoil and tension adjustment assembly includes a reciprocating shaft including an idler recoil section and a tension adjustment section. The tension adjustment section may be in communication with the grease port (or hydraulic fluid or oil port, etc.) and the idler recoil section may be in communication with a gas port (or other suitable fluid port). The grease and gas ports are coupled to the reciprocating shaft. The shaft is slideably coupled to a blocking plate and the housing either includes or is coupled to an abutment that engages the blocking plate in the event one of the idler recoil or tension adjustment sections develops a leak causing the reciprocating shaft to move towards the housing contact end. Engagement between the abutment and the blocking plate pushes the blocking plate to a position between the access opening and one of the grease or gas ports.

A method for modifying an idler recoil and tension adjustment assembly to provide an indication of gas leakage or grease leakage is also disclosed. The idler recoil and tension adjustment assembly includes a housing that, in turn, includes a housing contact end and a yoke contact end. The housing accommodates a reciprocating shaft including an idler recoil section and a tension adjustment section. The tension adjustment section is in communication with a grease port and the idler recoil section is in communication with a gas port. The method includes slideably coupling a blocking plate to the reciprocating shaft, coupling an abutment to the housing that engages the blocking plate in the event one of the idler recoil or tension adjustment sections develops a leak causing the reciprocating shaft to move towards the housing contact end as a result of one of the telescoping functions of the idler recoil section or tension adjustment section retracting. The method further includes engaging the abutment with the blocking plate and sliding the blocking plate to a position where the grease port or the gas port is blocked by the blocking plate when the tension adjustment section or the idler recoil section, respectively, develops a leak.

DETAILED DESCRIPTION

Figure 1:
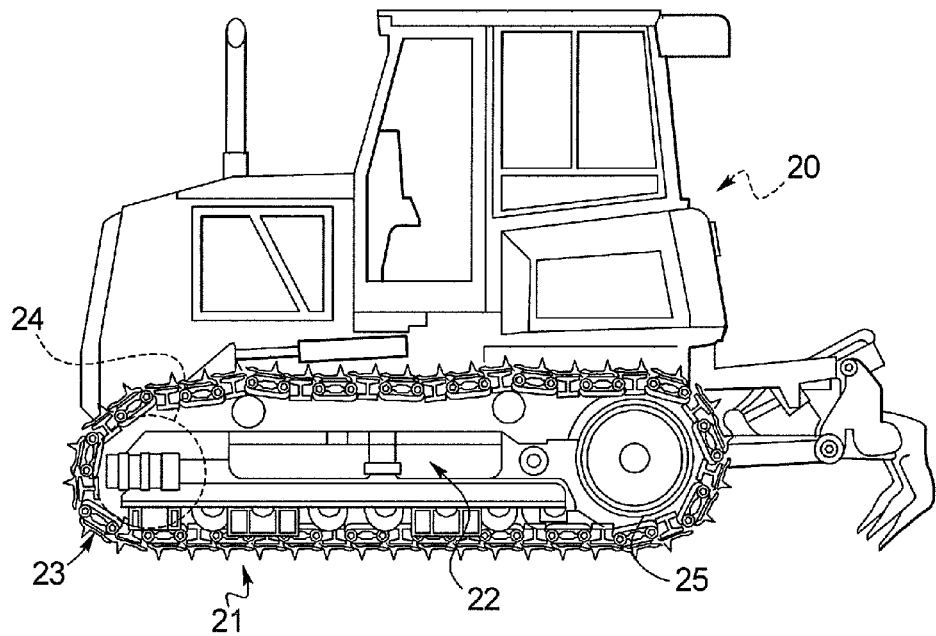
FIG. 1 is a side view of a machine that may be equipped with the idler recoil and tension adjustment assembly disclosed herein.

Referring to FIG. 1, a machine 20 according to the present disclosure may be a track type tractor 20 or some other machine that includes a drive track undercarriage 21 mounted around a track roller frame assembly 22. For example, a variety of track type machines, including but not limited to excavators, loaders and landfill equipment, as well as others, are within the scope of the present disclosure. In addition, these types of machines are themselves typically made up of smaller machines. For instance, track-type tractor 20 may be considered a machine according to the present disclosure, but the drive track undercarriage 21 may also be considered a machine according to the present disclosure.

Figure 2:
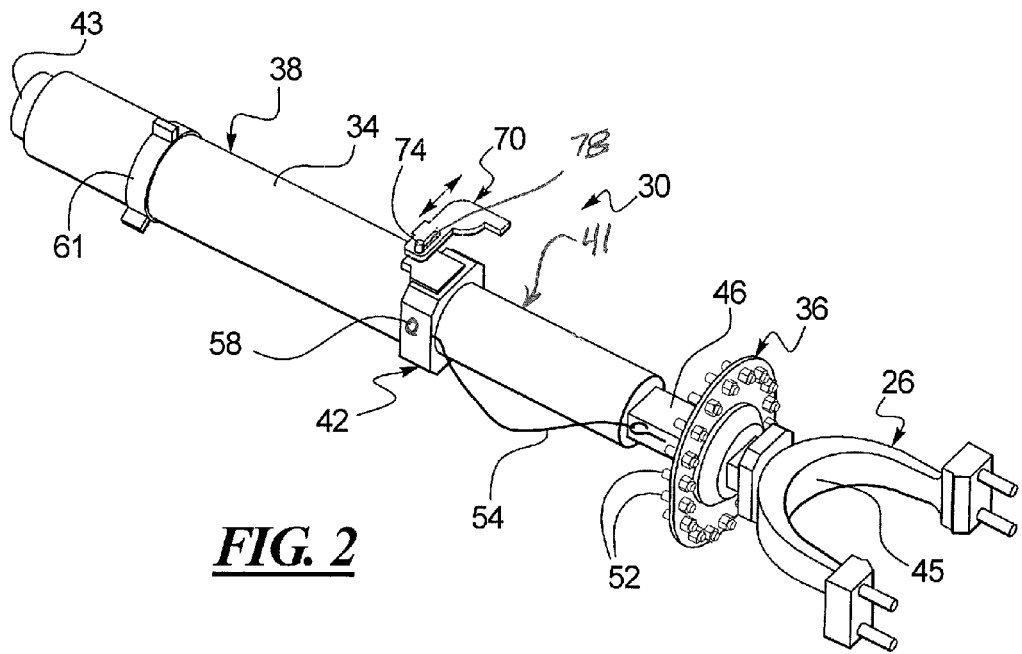
FIG. 2 is a perspective view of a disclosed idler recoil and tension adjustment assembly.

Turning to FIGS. 1 and 2, a chain 23 may be supported on one end by an idler 24 and on the other end by a sprocket 25 (FIG. 1). In FIG. 2, the idler 24 is supported on a yoke 26 that in turn is slidably supported in the track roller frame assembly 22, typically between wear plates that may be serviced at regular intervals. Those skilled in the art will appreciate that, during normal operation of machine 20, a variety of forces will act on the chain 23, and in turn on the idler 24, causing the idler 24 to move towards or away from the sprocket 25.

Figure 4:
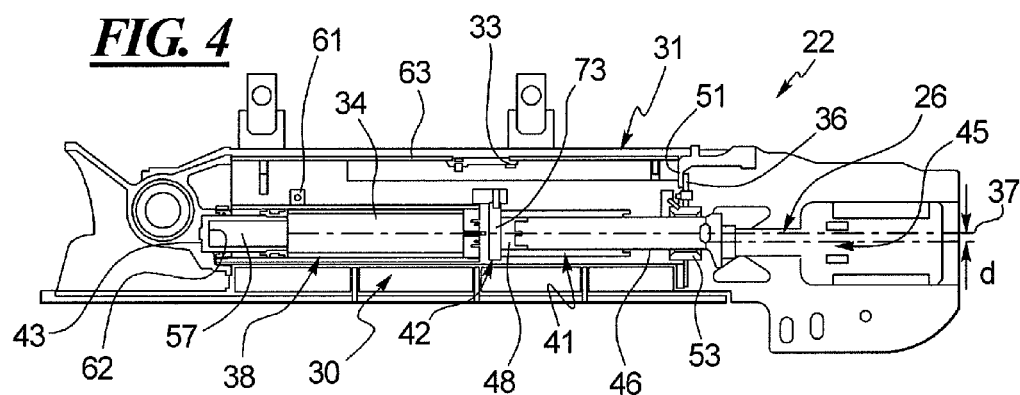
FIG. 4 is a side and sectional view of the disclosed idler recoil and tension adjustment assembly.

Viewing FIGS. 2 and 4, an idler recoil and tension adjustment assembly 30 is located within the housing 31 of track roller frame assembly 22 to absorb recoil forces and to provide tension adjustment in the chain 23 by the tension adjustment assembly 41. Those skilled in the art will appreciate that during normal operation, wear on the chain 23 and the associated rollers and idler 24 will typically cause a decrease track tension over time. This wear can be compensated for by adjusting a length of the reciprocating shaft 34 of the idler recoil and tension adjustment system 30 as described below.

The idler recoil and tension adjustment assembly 30 may be a complete subassembly as shown in FIG. 2. Specifically, the disclosed idler recoil and tension adjustment assembly 30 may include a reciprocating shaft 34 about which is mounted a slidable bulkhead 36, which may be slidable along a range of positions along an axis 37 (see FIG. 4). The reciprocating shaft 34 includes an idler recoil section 38 attached to a tension adjustment section 41 via an attachment section 42. The telescoping idler recoil and tension adjustment sections 38, 41 are located between a housing contact end 43 and the yoke 26.

In the embodiment illustrated below, grease is used as the working fluid in the tension adjustment section 41 because of its long working life and high viscosity. However, those skilled in the art will realize the other materials, such as oils, hydraulic fluids, etc. may be substituted for grease. Such substitutions may involve some refinements of the tension adjustment section, but such details are not particularly relevant to this disclosure. Therefore, use of the term "grease" below shall be deemed to cover oils, hydraulic fluids and other working fluids used in telescoping structures.

Similarly, in the embodiment shown, gas is used as the working fluid for the idler recoil section. However, those skilled in the art will realize the other materials, such as hydraulic fluids, etc., may be substituted for gas. Such substitutions may involve some refinements of the idler recoil section, but such details are not particularly relevant to this disclosure. Therefore, use of the term "gas" below shall be deemed to cover other suitable working fluids including liquids used in pressurized telescoping structures. A variety of both inert and non-inert gases in addition to certain fluids may be used for the idler recoil section.

Figure 3:
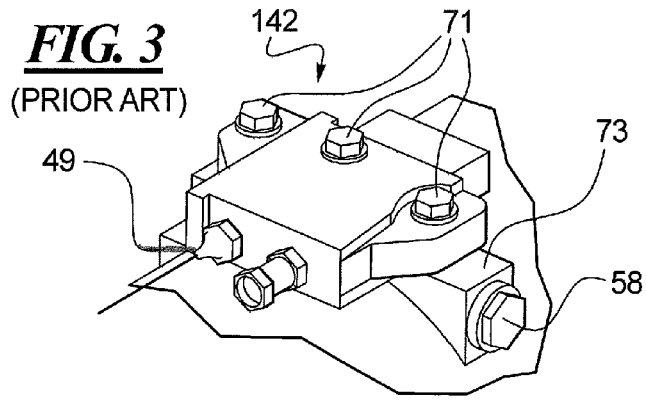
FIG. 3 is a perspective view of a prior art attachment/ manifold section disposed between the idler recoil section and tension adjustment section of a prior art idler recoil and tension adjustment assembly.
Figure 5:
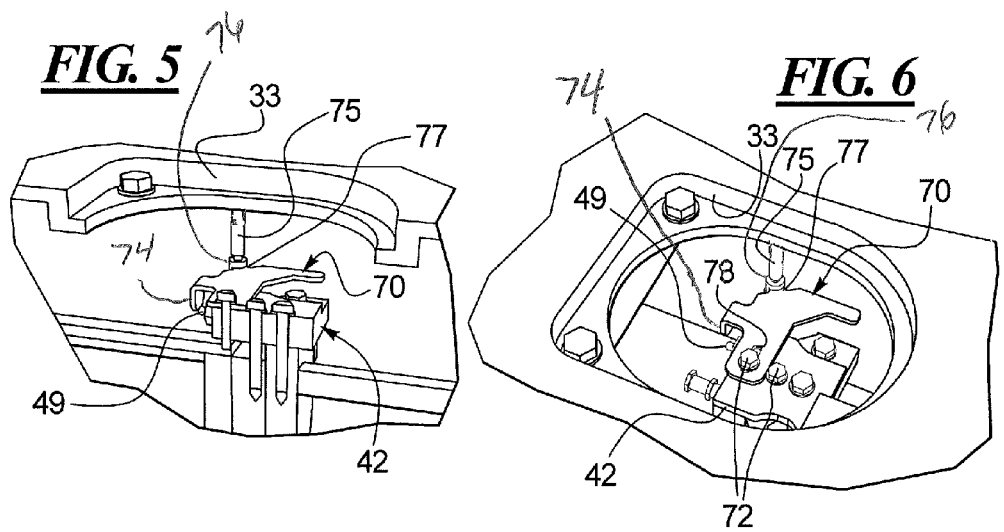
FIG. 5 is a partial perspective view of the idler recoil and tension adjustment assembly shown in FIG. 4, particularly illustrating a disclosed blocking plate and roller or abutment used to indicate leakage in one of the idler recoil or tension adjustment sections.

As seen in FIG. 4, the yoke 26 and its contact surface 45 may be offset a distance "d" from the axis 37. The yoke 26 is located on one end of a piston 46 that forms a portion of the tension adjustment section 41. The length-adjusting section 41 includes a grease cavity 48 defined in part by one end of the piston 46. The length of the reciprocating shaft 34 may be adjusted by adding or removing grease (or other suitable material) from grease cavity 48 via a grease (or other suitable fluid) port 49 that is attached to the reciprocating shaft 34 at interface attachment section 42 as best shown in FIGS. 3 and 5.

Referring to FIGS. 2 and 4, the yoke 26 is supported in housing 31 by attaching the bulkhead 36 to a counterpart bulkhead 51 of the housing 31 via an array of fasteners 52 that surround the piston 46. This attachment strategy also closes off one potential debris access pathway into the interior of the housing 31. Although the bulkhead 36 is fixed with regard to the housing 31, the piston 46 can slide within the bulkhead 36 via a bushing 53. In order to better facilitate a potential removal of the idler recoil and tension adjustment assembly 30 from the housing 31 for servicing overhauls and the like, the bulkhead 36 may be tethered to the reciprocating shaft 34 or interface 42 via a cable 54 that is attached at opposite ends to the bulkhead 36 and the attachment interface 42.

The idler recoil section 38 may be of a conventional design that includes a variable pressure cavity 57 (FIG. 4) that is fluidly connected to a gas (or other fluid) port 58 (FIGS. 3 and 7) attached to the interface attachment section 42.

In order to assist in installation of idler recoil and tension adjustment assembly 30 into the housing 31, a guide 61 may be attached at a suitable location on reciprocating shaft 34, such as about idler recoil section 38 as shown in FIGS. 2 and 4, to assist in guiding the housing contact end 43 toward engagement with the counter bore 62.

Referring to FIG. 4, although not necessary, the housing 31 may include a one-piece or multiple-piece frame 63 made up of a variety of plates and/or machined components welded to one another to enclose the length of reciprocating shaft 34 except for the inclusion of an access opening 33 adjacent the yoke 26 that may be closed with a cover (not shown). In particular, the access opening 33 is normally closed to prevent debris such as mud, gravel and the like from interfering with the operation and the working life of the idler recoil and tension adjustment assembly 30. Because this enclosure may not be completely fluid tight, there may be the inclusion of one or more drains ports located along the length of frame 63 to drain liquid from within housing 31. Although such drain ports are not shown, they may be of a conventional design and may be opened and closed via a conventional bolt plugging strategy of a type known in the art.

The attachment of the bulkhead 36 to the housing bulkhead 51 substantially closes the otherwise open end of the housing 31 near the yoke 26. The access opening 33 may be normally closed, but may be opened for servicing and the like in order to access the grease port 49 and/or gas port 58.

Figure 6:
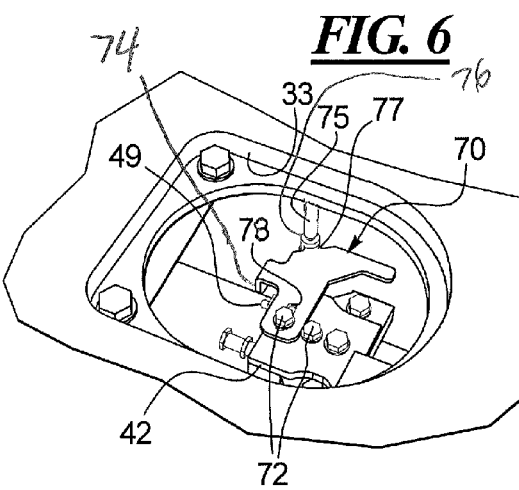
FIG. 6 is another partial perspective view of the idler recoil and tension adjustment assembly shown in FIG. 4, also illustrating a disclosed blocking plate and abutment used to indicate leakage in one of the recoil or tension adjustment sections as seen through an access opening in the assembly housing.
Figure 7:
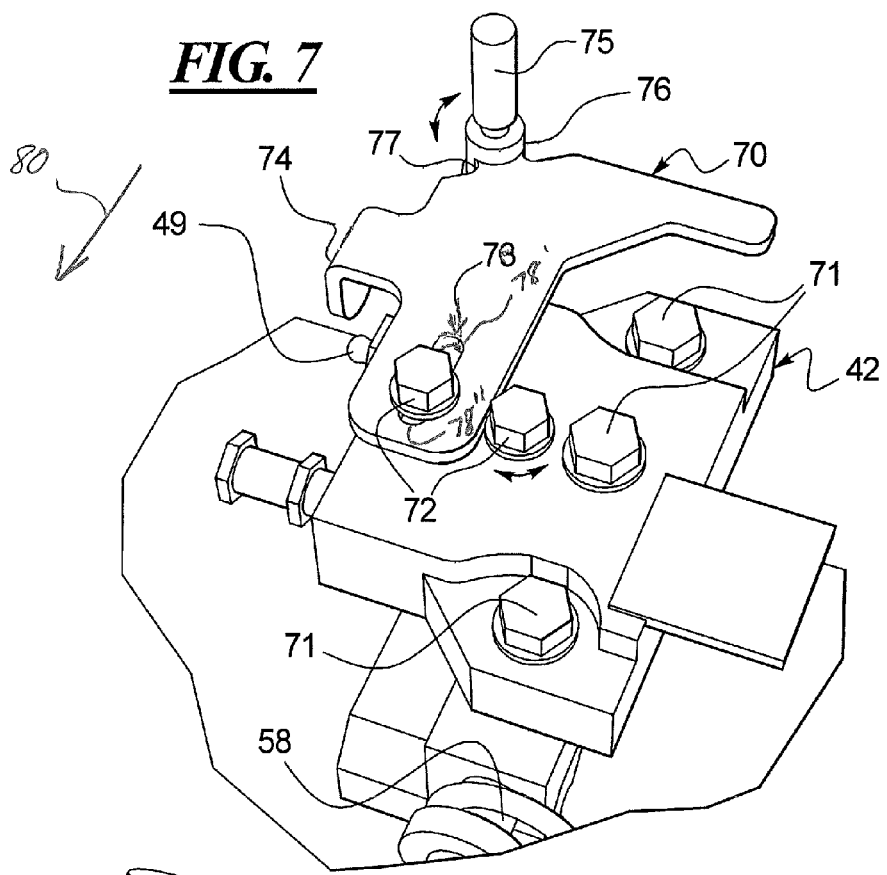
FIG. 7 is a top perspective view of the blocking plate, abutment and attachment section illustrated in FIGS. 5-6.
Figure 8:
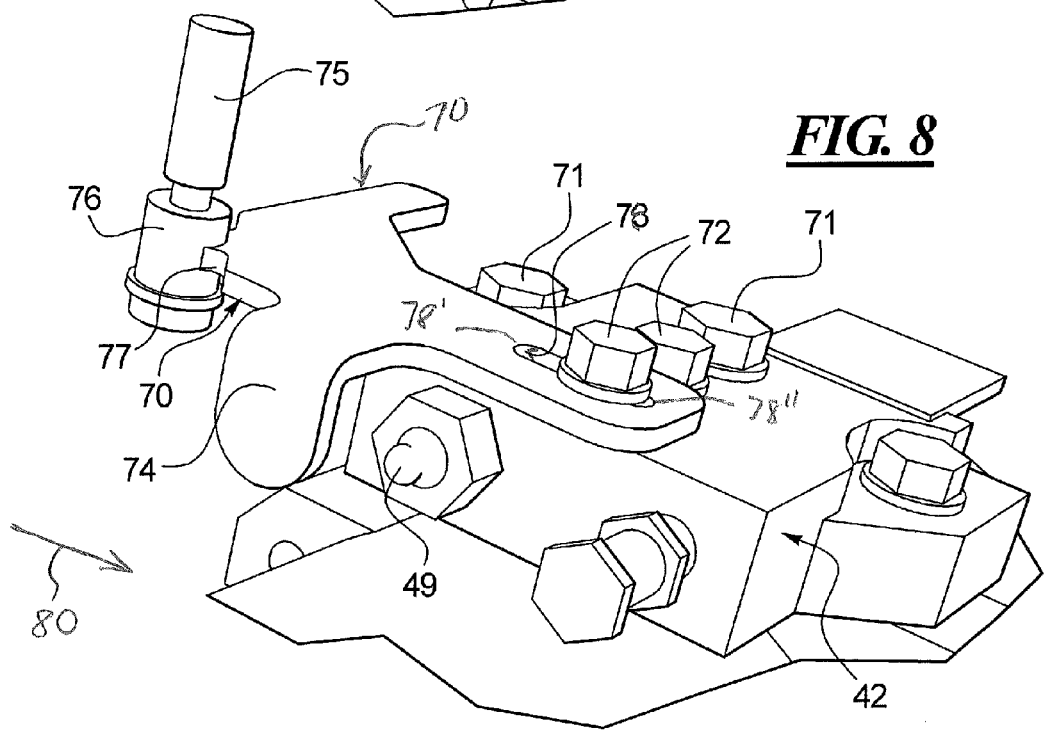
FIG. 8 is an end perspective view of the blocking plate, abutment and attachment section illustrated in FIGS. 5-7.
Figure 9:
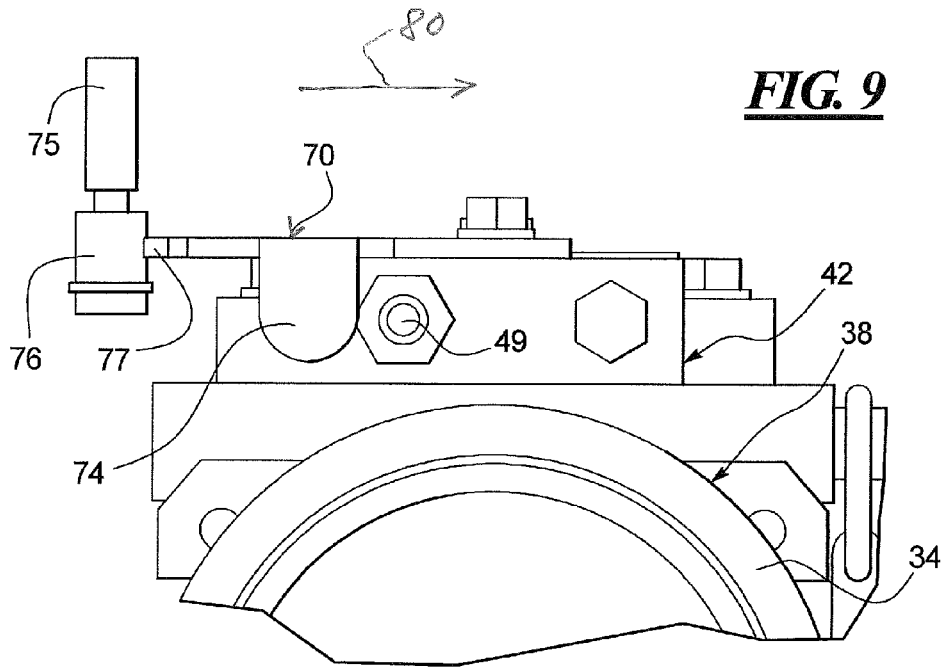
FIG. 9 is a partial left and view of the idler recoil and tension adjustment assembly illustrated in FIG. 4.
Figure 10:
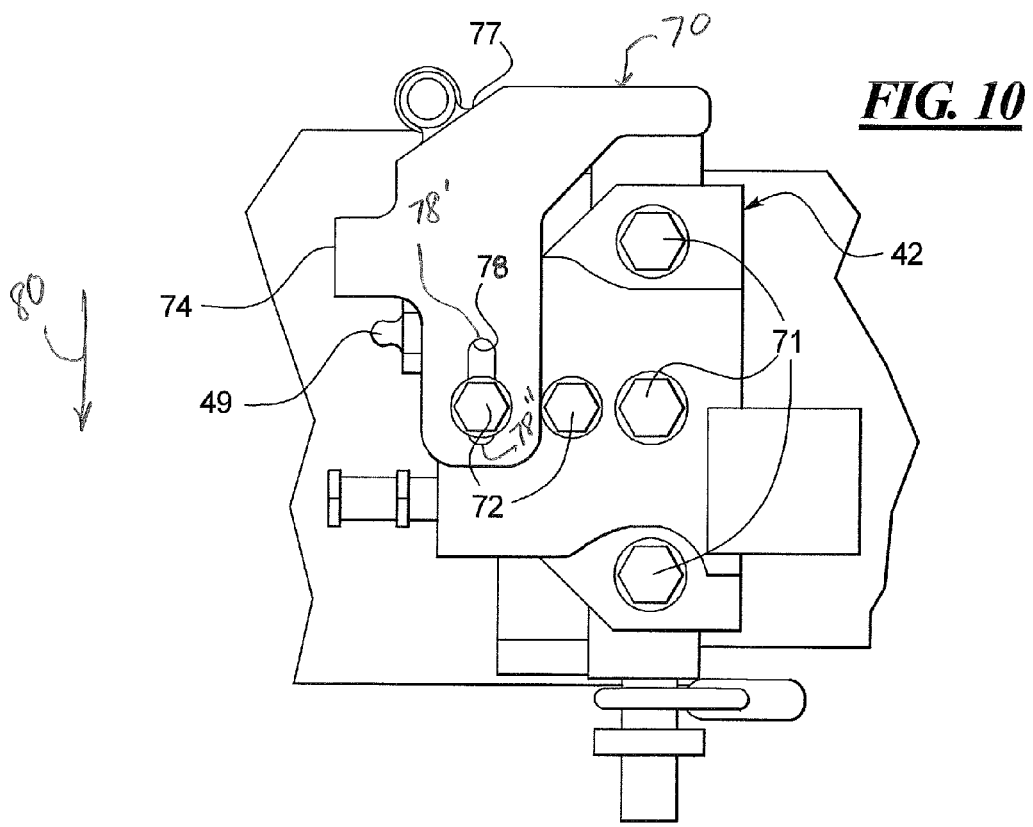
FIG. 10 is a partial top plan view of the idler recoil and tension adjustment assembly illustrated in FIG. 4.

Turning to the problems solved by the present disclosure, and referring first to FIG. 2, a blocking plate 70 has been mounted to the attachment section 42 which includes the grease port 49 (not shown in FIG. 2, see FIGS. 3 and 5-8) and the gas port 58 (see also FIGS. 3 and 7). The grease port 49 and gas port 58 serve as markers in accordance with this disclosure for indicating to the operator that a leak is present in either the idler recoil section 38 or the tension adjustment section 41.

More specifically, turning to FIG. 3, a prior art attachment section 142 is disclosed with a grease port 49 and a gas port 58. A plurality of fasteners 71 are used to couple the attachment section 142 to a wall 73 that, at least in part, separates the tension adjustment section 41 from the idler recoil section 38. As shown in FIGS. 2 and 5-8, the blocking plate 70 is mounted to the attachment section 42 using additional fasteners 72, one of which passes through an elongated slot 78 in the blocking plate 70. In the particular refinement shown, the blocking plate 70 also includes a downwardly extending tab 74. Also, referring to FIGS. 5-8, a shaft 75 may be attached to the housing as shown in FIGS. 5-6 and may also include a roller mechanism 76.

In operation, for the particular embodiment shown, if there is a leak in the idler recoil section 38, the reciprocating shaft 34 and the attachment section 42 will move to the left or towards the housing contact end 43 of the idler recoil and tension adjustment assembly 30 (see FIGS. 2 and 4). In this event, the attachment section 42 and blocking plate 70 move to the left in the perspective of FIGS. 4-7 and will engage the shaft 75 and/or roller 76 along the slanted surface 77 of the blocking plate 70. Engagement between the slanted surface 77 and the shaft or roller 75, 76 causes the blocking plate 70 to be pushed to the right from the perspective of FIG. 8 due to the elongated slot 78 through which one of the fasteners 72 passes. Essentially, the blocking plate 70 moves in the direction of the arrow 80 (see FIGS. 7-10 so that the fastener 72 moves from one end 78' of the slot 78 to the other end 78" of the slot 78. As a result, the tab 74 moves towards and at least partially covers the grease port 49 as can be seen from FIGS. 7 and 8. When this happens, an operator viewing the attachment section 42 from the access opening 33 can no longer see the grease port 49. This can be used as a positive indication that a gas leak has occurred in the idler recoil section 38. With the grease port 49 covered, the operator still has access to the gas port 58 and can begin investigating the source of the leak in the idler recoil section 38.

One skilled in the art will fully realize that such a mechanism could be employed so that the gas port 58 is covered in the event of a leak in either the idler recoil section 38 or tension adjustment section 41. Still further, a reminder or notice could be posted on the access cover (not shown) to remind the operator what to look for when he/she suspects a leak in either the idler recoil section 38 or the tension adjustment section 41. Further, in the embodiment illustrated in FIGS. 5-6, the shaft 75 is mounted to the housing 31 but the shaft could be mounted elsewhere, such as to the access opening door or to a nearby guide 61.

Figure 11:
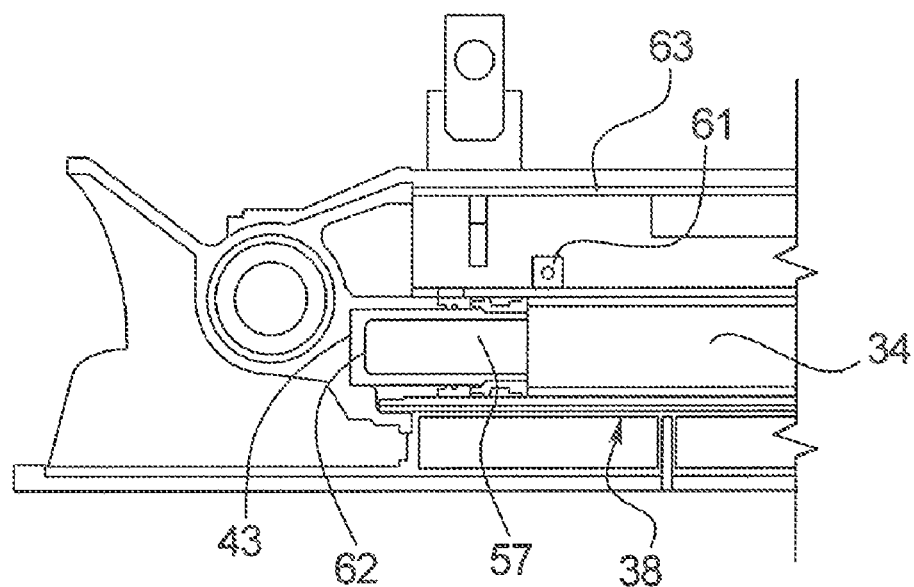
FIGS. 11 and 12 are partial front and sectional views illustrating movement of the reciprocating shaft to the left after a leak in either the idler recoil section and/or tension adjustment section is experienced.
Figure 12:
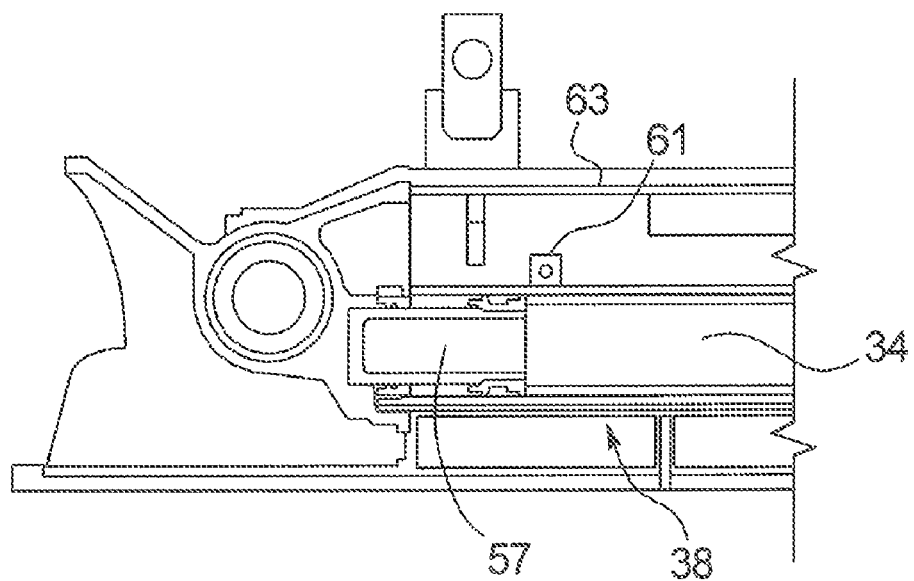

Turning to FIGS. 11-12, the movement to the left of the reciprocating shaft 34 and the shrinkage of the gas volume 57 are illustrated in the event the idler recoil section 38 develops a leak. This leftward movement (and the term left is only used for purposes of orientation with the disclosed drawings) causes the slanted surface 77 of the blocking plate 70 to engage the shaft 75 or roller 76 which, in turn, causes the blocking plate to slide along the fastener 72 that passes through the elongated slot 78 in the direction of the arrow 80 thereby enabling the downwardly extending tab 74 to cover or block access or block view of the grease port 49 from the vantage point of the access opening 33 as shown in FIGS. 7-10. This relatively straightforward retrofit can be provided in the form of a kit or as original equipment and can provide a clear indication to the operator as to which section, the idler recoil section 38 or the tension adjustment section 41 is leaking. In the embodiment illustrated, if the idler recoil section 38 is leaking, the blocking plate 70 will engage the shaft 75 thereby causing the grease port 49 to be blocked. Either in the form of an owner's manual or a label on the access opening door or on the casing, the operator may be reminded that when the grease port 49 is blocked, that may be an indication of leakage in the idler recoil section 38. Again, similar principles could be applied so that the gas port 52 is blocked in the event grease, hydraulic fluid or oil may be leaking from the tension adjustment section 41.

The disclosed system requires no electronics and is purely mechanical in nature and therefore does not add significantly to the cost of original equipment and can be efficiently added to original equipment in the form of a retrofit or retrofit kit.

INDUSTRIAL APPLICABILITY

The idler recoil and tension adjustment assembly 30 of the present disclosure finds potential application in any machine that includes an idler that supports a track that undergoes forces necessitating a recoil system. The present disclosure finds specific applicability to track roller frame assemblies associated with tracked type tractors and other track machines known in the art. The packaging and assembly strategies exemplified by the present disclosure find applicability to easing manufacturing complexities associated with constructing tracked machines of the type typified in FIG. 1.

Many track-type machines include idler recoil and tension adjustment assemblies like those shown at 30 in this disclosure. Such assemblies 30 can suffer from two malfunctions that are difficult to detect. First, gas can leak from the idler recoil section 38 (or another type of fluid if utilized in the idler recoil section 38) or grease can leak from the tension adjustment section 41 (or other type of oil or hydraulic fluid). Due to the size and complexity of such track-type machines, it may be difficult for the operator to determine which component or section is leaking. By providing a blocking plate on the attachment interface section 42, which provides a visual signal to the operator in the event one of the two sections 38, 41 is leaking, the operator can quickly identify which section is leaking and conduct the repairs as expeditiously as possible. Without the improvements of this disclosure, the operator may be forced to test or pressure test both sections 38, 41 when only one of them is leaking. If the equipment is in current use, downtime can be reduced and work schedules maintained.

LIST OF ELEMENTS
TITLE: Combination Idler Recoil and Tension Adjustment
Assembly and Method for Identifying
Source of Leakage in Same
FILE: 09-559

| | |
|---|---|
| 10 | |
| 11 | |
| 12 | |
| 13 | |
| 14 | |
| 15 | |
| 16 | |
| 17 | |
| 18 | |
| 19 | |
| 20 | machine |
| 21 | drive track undercarriage |
| 22 | track roller frame assembly |
| 23 | chain |
| 24 | idler |
| 25 | sprocket |
| 26 | yoke |
| 27 | |
| 28 | |
| 29 | |

-continued

LIST OF ELEMENTS
TITLE: Combination Idler Recoil and Tension Adjustment
Assembly and Method for Identifying
Source of Leakage in Same
FILE: 09-559

| | |
|---|---|
| 30 | idler recoil and tension adjustment assembly |
| 31 | housing |
| 32 | |
| 33 | access opening |
| 34 | reciprocating shaft |
| 35 | |
| 36 | bulkhead |
| 37 | access |
| 38 | idler recoil section |
| 39 | |
| 40 | |
| 41 | tension adjustment section |
| 42 | attachment section |
| 43 | housing contact end |
| 44 | |
| 45 | yoke contact surface |
| 46 | piston |
| 47 | |
| 48 | grease cavity |
| 49 | |
| 50 | |
| 51 | housing bulkhead |
| 52 | fasteners |
| 53 | bushing |
| 54 | cable |
| 55 | |
| 56 | |
| 57 | gas cavity |
| 58 | gas port |
| 59 | |
| 60 | |
| 61 | guide |
| 62 | counter bore |
| 63 | multiple piece frame |
| 64 | |
| 65 | |
| 66 | |
| 67 | |
| 68 | |
| 69 | |
| 70 | blocking plate |
| 71 | fasteners |
| 72 | fasteners |
| 73 | elongated slot |
| 74 | downwardly extending tab |
| 75 | shaft |
| 76 | roller |
| 77 | slanted surface of blocking plate |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |
| 91 | |
| 92 | |
| 93 | |
| 94 | |
| 95 | |
| 96 | |
| 97 | |
| 98 | |
| 99 | |
| 100 | |

What is claimed is:

1. An idler recoil and tension adjustment assembly comprising:
    a housing including a housing contact end and a yoke contact end;
    the housing accommodating a reciprocating shaft including a idler recoil section and a tension adjustment section;
    the tension adjustment section being in communication with a grease port;
    the idler recoil section being in communication with a gas port;
    the grease and gas ports being coupled to the reciprocating shaft;
    the reciprocating shaft being slideably coupled to a blocking plate and the housing being coupled to an abutment that engages the blocking plate in the event the idler recoil section develops a leak thereby causing the shaft to move towards the housing contact end and the blocking plate towards the grease port;
    wherein engagement between the abutment and blocking plate pushes the blocking plate to a position where the grease port is blocked by the blocking plate when the idler recoil section develops a leak.

2. The assembly of claim 1 wherein the grease and gas ports are coupled to the reciprocating shaft between the idler recoil section and the tension adjustment section.

3. The assembly of claim 1 wherein the idler recoil section is coupled to the tension adjustment section at an attachment section and the grease and gas ports are coupled to the attachment section.

4. The assembly of claim 1 wherein in the event the idler recoil section develops a leak, the blocking plate and shaft move towards the housing contact end and the blocking plate engages the abutment which pushes the blocking plate to a position where the grease port is at least partially covered by at least a portion of the blocking plate.

5. The assembly of claim 1 wherein the housing includes an access opening at least partially aligned with the grease and gas ports.

6. The assembly of claim 5 wherein in the event the idler recoil section develops a leak, the blocking plate and reciprocating shaft moves toward the housing contact end and the blocking plate engages the abutment which pushes the blocking plate to a position between the grease port and the access opening so the grease port cannot be seen through the access opening.

7. The assembly of claim 1 wherein the blocking plate includes a downwardly extending tab that blocks access to the grease port when the blocking plate engages the abutment as a result of one of the idler recoil section developing a leak.

8. A machine comprising:
    a track roller frame assembly including a housing accommodating an idler recoil and tension adjustment assembly, the housing including a housing contact end and a yoke contact end, the housing also including an access opening;
    the idler recoil and tension adjustment assembly including a reciprocating shaft including a idler recoil section and a tension adjustment section;
    the tension adjustment section being in communication with a grease port;
    the idler recoil section being in communication with a gas port;
    the grease and gas ports being coupled to the reciprocating shaft;
    the shaft being slidably coupled to a blocking plate and the housing being coupled to an abutment that engages the blocking plate in the event the idler recoil section develops a leak causing the reciprocating shaft to move towards the housing contact end;
    the grease port is blocked by the blocking plate when the idler recoil section develops a leak.

9. The machine of claim 8 wherein the grease and gas ports are coupled to the reciprocating shaft between the idler recoil section and the tension adjustment section.

10. The machine of claim 8 wherein the idler recoil section is coupled to the tension adjustment section at an attachment section and the grease and gas ports are coupled to the attachment section.

11. The machine of claim 8 wherein in the event the idler recoil section develops a leak, the blocking plate and reciprocating shaft move towards the housing contact end and the blocking plate engages the abutment which pushes the blocking plate to a position between the access opening and the grease port.

12. The machine of claim 8 wherein the blocking plate includes a downwardly extending tab that moves between one of the grease port and the access opening when the blocking plate engages the abutment as a result of the idler recoil section developing a leak.

13. A method of modifying an idler recoil and tension adjustment assembly to provide an indication of gas leakage or grease leakage, the idler recoil and tension adjustment assembly including a housing including a housing contact end and a yoke contact end, the housing accommodating a reciprocating shaft including a idler recoil section and a tension adjustment section, the tension adjustment section being in communication with a grease port, the idler recoil section being in communication with a gas port, the method comprising:
    slidably coupling a blocking plate to the reciprocating shaft;
    coupling an abutment to the housing that engages the blocking plate in the event the idler recoil section develops a leak causing the reciprocating shaft to move towards the housing contact end;
    engaging the abutment with the blocking plate and sliding the blocking plate to a position where the grease port is blocked by the blocking plate when the the idler recoil section develops a leak.

14. The method of claim 13 including providing a slot in the blocking plate and coupling the blocking plate to the reciprocating shaft with a fastener that extends through the slot.

15. The method of claim 13 including providing an access opening in the housing in alignment with the grease port.

16. The method of claim 13 including providing a downwardly extending tab that blocks access to the grease ports when the blocking plate engages the abutment as a result of the idler recoil section developing a leak.

17. The method of claim 13 wherein the slidably coupling of the blocking plate to the reciprocating shaft includes providing a slot in the blocking plate and coupling the blocking plate to the reciprocating shaft with a fastener that extends through the slot and at a position wherein in the event the idler recoil section develops a leak, the blocking plate and shaft move towards the housing contact end and the blocking plate engages the abutment which pushes the blocking plate to a position blocking access to the grease port.

18. The method of claim 13 wherein the housing includes an access opening and the slidably coupling of the blocking plate to the reciprocating shaft includes providing a slot in the blocking plate and a downwardly extending tab on the blocking plate, and coupling the blocking plate to the reciprocating shaft with a fastener that extends through the slot and at a position wherein in the event the idler recoil section develops a leak, the blocking plate and shaft move towards the housing contact end and the blocking plate engages the abutment which pushes the blocking plate to a position where the downwardly extending tab is disposed between the grease port and the access opening.

* * * * *